United States Patent
White et al.

[11] Patent Number: 5,628,681
[45] Date of Patent: May 13, 1997

[54] FISH CLEANING BOARD

[76] Inventors: Robert J. White, 1205 N. L St., Lake Worth, Fla. 33460; Richard W. White, 3006 French Ave., Lake Worth, Fla. 33461

[21] Appl. No.: 664,736

[22] Filed: Jun. 17, 1996

[51] Int. Cl.$^6$ .................................................. A22C 25/06
[52] U.S. Cl. .................................................. 452/194
[58] Field of Search ........................ 452/194, 195, 452/196; 220/523, 525, 507

[56] References Cited

U.S. PATENT DOCUMENTS

| | | | |
|---|---|---|---|
| 3,015,841 | 1/1962 | Reutz | 452/195 |
| 3,713,188 | 1/1973 | Holiday | 452/196 |
| 4,229,858 | 10/1980 | Baxter . | |
| 4,454,630 | 6/1984 | Shouldis | 452/195 |
| 4,485,527 | 12/1984 | Stachowiak . | |
| 4,815,169 | 3/1989 | Valleau | 452/195 |
| 4,846,076 | 7/1989 | Meages . | |
| 5,474,494 | 12/1995 | Sims | 452/194 |

FOREIGN PATENT DOCUMENTS

| | | | |
|---|---|---|---|
| 1267593 | 4/1990 | Canada | 452/194 |
| 51108 | 7/1932 | Norway | 220/523 |

Primary Examiner—Willis Little
Attorney, Agent, or Firm—Alvin S. Blum

[57] ABSTRACT

A fish cleaning board has a lower surface that slopes to the rear. A fence around the edges contains liquid and debris. An elongate, flat horizontal fish cleaning platform extends upward from the lower surface so that liquid and debris drain off. One or more additional platforms extend upward to the rear of the fish cleaning platform for holding cleaned fish portions. A depression at the center rear of the lower surface cooperates with a hole in the fence and a drain tube to drain material from the board. One or more recesses in the top of the fence hold tools or rigged baits away from the cleaning operation. The board may be vacuum formed from a single plastic sheet for economy of manufacture and easy cleaning. A flange around the perimeter extends downward. It is adapted to securely engage the top of a cooler chest and maintain the sloping angle of the lower surface when the cooler rests on a horizontal surface. The same sloping angle is maintained when the flange rests upon a flat horizontal surface such as a table.

16 Claims, 2 Drawing Sheets

FISH CLEANING BOARD

BACKGROUND OF THE INVENTION

1. Field of the Invention

This invention relates to butchering apparatus and more particularly to apparatus for supporting a fish during cleaning and dressing.

2. Description of the Related Art

Fishermen generally clean their catch on some sort of flat surface on which they can lay the whole fish while scaling, skinning, eviscerating and or fileting. Blood, scales, bones, viscera and other debris tend to accumulate and contaminate the cleaned portions and must be swept or washed away from time to time. It is difficult to find a large enough surface on which to clean the fish. Often, the only unencumbered surface is the top of a cooler chest.

When this surface is used for that purpose, waste may drip down the sides and contaminate the floor and the chest contents, as well as damaging the chest top.

SUMMARY OF THE INVENTION

It is accordingly an object of the invention to provide a fish cleaning board which can conveniently fit securely onto a cooler chest cover and provide for supporting a small or large fish while allowing waste to drain off. It is yet another object to provide a fence around the board to contain liquids and drain them away from the user. It is yet another object to provide a drained surface on which to place cleaned fish portions.

These and other objects, advantages and features of the invention will become more apparent when the detailed description is considered in conjunction with the drawings, in which like characters refer to like elements in the various figures.

DETAILED DESCRIPTION OF PREFERRED EMBODIMENTS

Figure 1:
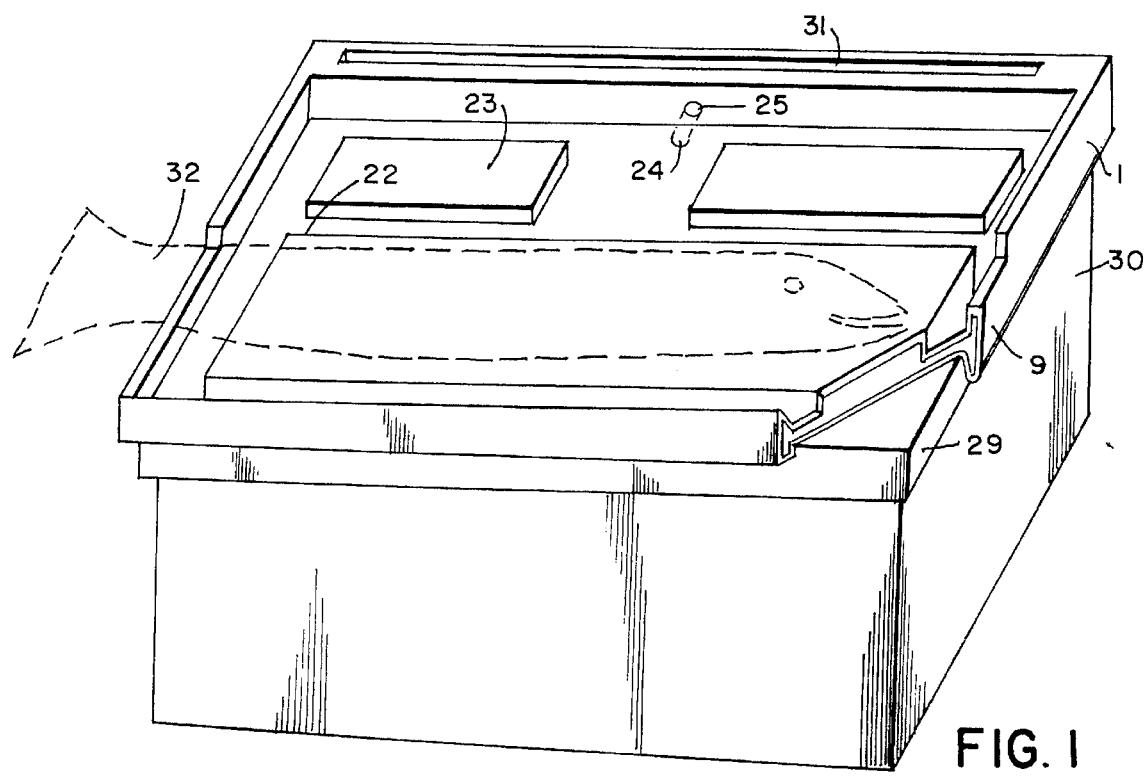
FIG. 1 is a perspective view, partially cut away, of the invention on a cooler.
Figure 2:
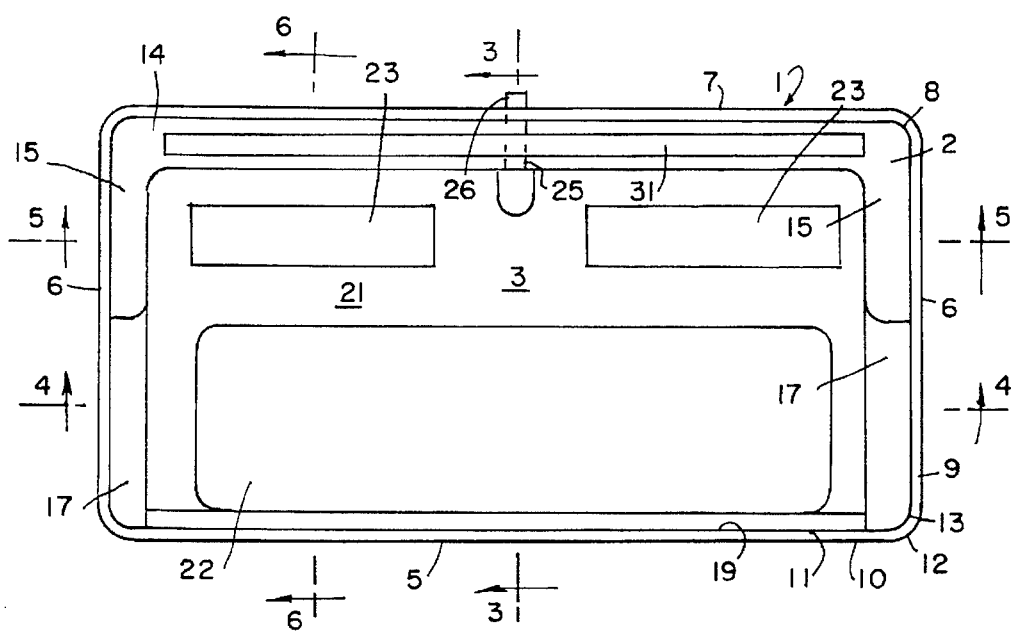
FIG. 2 is a top view of the invention.
Figure 3:
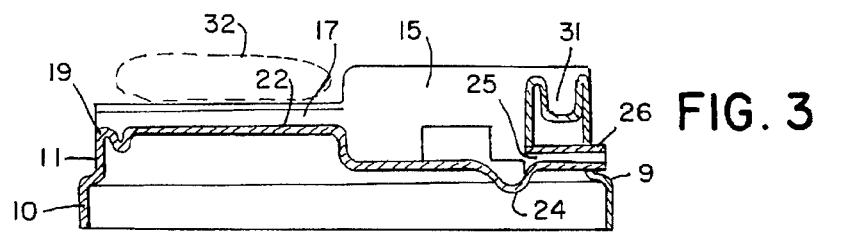
FIG. 3 is a sectional view taken on line 3—3 of FIG. 2.
Figure 5:
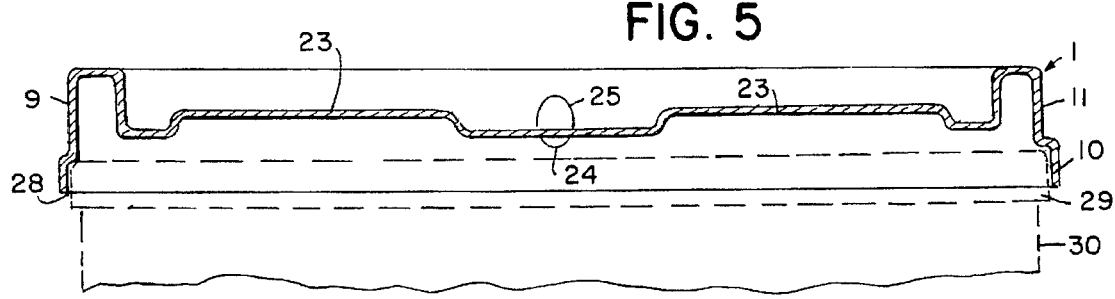
FIG. 5 is a sectional view taken on line 5—5 of FIG. 2.
Figure 6:
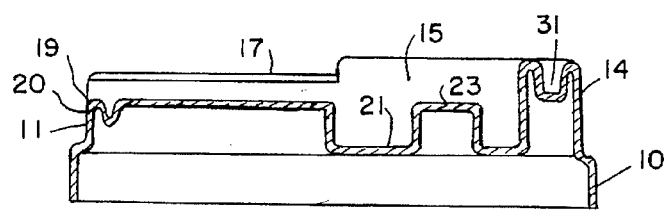
FIG. 6 is a sectional view taken on line 6—6 of FIG. 2.

Referring now to the drawings, the fish cleaning board 1 of the invention comprises a rigid, substantially rectangular panel 2, preferably manufactured in one piece of plastic for economy of manufacture, corrosion resistance and ease of cleaning. Vacuum thermoforming of a single plastic sheet has been found to be effective. As shown in FIGS. 1 and 5, the board is adapted to fit securely on top of a cooler 30 (shown in phantom) of the type generally carried by fishermen. The board has a flange 9 extending downward with a lowermost portion 10 having a perimetral dimension 12 adapted to snugly encircle the top 29 of the cooler, with an upper portion 11 of the flange having a lesser perimetral dimension 13 for resting on top of the cooler top when the lowermost portion encircles the sides 28 of the cooler top. The user can then clean fish on the board without the board moving about, being securely attached to the cooler without the need for fasteners. The board is provided along its perimeter 8 with a continuous means for retaining materials within the confines of the board during cleaning in the form of an upwardly extending fence portion 14 along the back edge 7, fence portions 15 and 17 along side edges 6 and fence portion 19 along front edge 5. Fence portions 14 and 15 are at the highest elevation 16. Fence portions 17 are at a lower elevation 18 so that a fish 32 longer than the board can be accomodated by extending over this portion and butting up against the higher elevation portion 15 as shown in FIGS. 1 and 3. Front fence portion 15 is at the lowest elevation 20.

The panel has a top surface 3 and a bottom surface 4. The top surface 3 is configured to have a lower surface 21 which slopes down continuously to the rear edge. The fence extends upward from his lower surface 21 so that a liquid and debris is contained and drains to the back. The top surface of fence portions 17 and 19 are sloped down away from the edges. One or more elongate recesses 31 may be provided on top of rear fence portion 14 for holding tools or rigged baits away from the cleaning operation. A depression 24 is formed at the rearmost and center of the lower surface 21 so that fluid will ultimately drain therein. A hole 25 in the fence adjacent the depression allows liquid to drain from the depression. A tube 26 in the hole provides a conduit for the draining liquid and debris which may be caught in an outside container, not shown. Rising up from the lower surface 21 is a horizontal, elongate, flat first platform 22 upon which fish may be cleaned, while any debris and liquid fall away to the lower surface 21. Second elevated platforms 23 are provided to the rear of the panel for holding cleaned portions of fish out of the debris and liquids of the cleaning operation.

Figure 4:
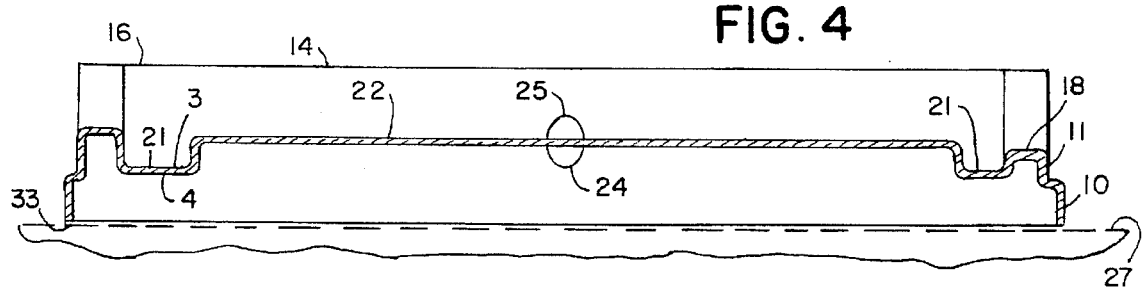
FIG. 4 is a sectional view taken on line 4—4 of FIG. 2.

The slope of the lower surface 21 is maintained rearward when the board is held on a cooler with the cooler top horizontally oriented, by the flange arrangement. The bottom edge 33 of the flange is constructed to also maintain the slope of the lower surface 21 rearward when the edge 33 is resting upon a horizontal support surface 27 such as a table as shown in FIG. 4.

The board may be formed by other means well known in the art such as rotocasting, injection molding and blow molding. FIG. 1 illustrates a blow molded board 1 having a different flange configuration.

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A fish cleaning board for mounting on the top of a cooler and for also mounting on a flat surface, the board comprising:

a rigid, substantially rectangular panel having a top surface, a bottom surface and a perimeter comprising a front edge, side edges and a back edge;

a flange extending downward from the perimeter and having a lowermost portion adapted to snugly encircle and engage a cooler top on the sides thereof;

an upper portion of the flange attached to the lowermost portion and having a lesser perimetral dimension than the lowermost portion for resting upon the cooler top on the upper surface thereof when the lowermost portion encircles the sides for secure mounting thereon;

the perimeter provided with an upwardly directed fence extending along the back edge and part way along the side edges at a first elevation and extending along the balance of the side edges at a second elevation and along the front edge at a third elevation, the first elevation being greater than the second elevation and the second elevation being greater than the third elevation;

the top surface of the panel having a lower surface that slopes downward from the front edge to the back edge when the board is mounted on a cooler top or when mounted on a flat horizontal support surface;

a large flat horizontal first platform attached to and elevated above the sloping lower surface for cleaning fish thereon; and at least one additional flat horizontal platform attached to and elevated above the sloping lower surface and positioned closer to the back edge than the first platform for holding cleaned fish.

2. The fish cleaning board according to claim 1 further comprising a depression in the lower surface located adjacent the fence at the back edge.

3. The fish cleaning board according to claim 2 further comprising a drainage hole in the fence cooperating with the depression to provide drainage of matter from the lower surface.

4. The fish cleaning board according to claim 3 further comprising a tube in the hole for draining matter through the fence.

5. The fish cleaning board according to claim 1 further comprising at least one elongate recess in the fence at the upper surface thereof.

6. The fish cleaning board according to claim 1 formed of a single piece of plastic.

7. The fish cleaning board according to claim 1 formed by vacuum forming a single plastic sheet.

8. A fish cleaning board for mounting on the top of a cooler and for also mounting on a flat surface, the board comprising:

a rigid, substantially rectangular panel having a top surface, a bottom surface and a perimeter comprising a front edge, side edges and a back edge;

a flange extending downward from the perimeter and having a lowermost portion adapted to snugly encircle and engage a cooler top on the sides thereof;

the perimeter provided with an upwardly directed fence extending along the back edge and part way along the side edges at a first elevation and extending along the balance of the side edges at a second elevation and along the front edge at a third elevation, the first elevation being greater than the second elevation and the second elevation being greater than the third elevation;

the top surface of the panel having a lower surface that slopes downward from the front edge to the back edge when the board is mounted on a cooler top or when mounted on a flat horizontal support surface;

a large flat horizontal first platform attached to and elevated above the sloping lower surface for cleaning fish thereon; and at least one additional flat horizontal platform attached to and elevated above the sloping lower surface and positioned closer to the back edge than the first platform for holding cleaned fish.

9. The fish cleaning board according to claim 8 further comprising a depression in the lower surface located adjacent the fence at the back edge.

10. The fish cleaning board according to claim 9 further comprising a drainage hole in the fence cooperating with the depression to provide drainage of matter from the lower surface.

11. The fish cleaning board according to claim 10 further comprising a tube in the hole for draining matter through the fence.

12. The fish cleaning board according to claim 8 further comprising at least one elongate recess in the fence at the upper surface thereof.

13. The fish cleaning board according to claim 8 formed of a single piece of plastic.

14. The fish cleaning board according to claim 8 formed by vacuum forming a single plastic sheet.

15. The fish cleaning board according to claim 8 formed by blow molding.

16. A cleaning board for mounting on the top of a cooler and for also mounting on a flat surface, the board comprising:

a rigid, substantially rectangular panel having a top surface, a bottom surface and a perimeter comprising a front edge, side edges and a back edge;

a flange extending downward from the perimeter and having a lowermost portion adapted to snugly encircle and engage a cooler top on the sides thereof;

the perimeter provided with an upwardly directed fence extending along the back edge and part way along the side edges at a first elevation and extending along the balance of the side edges at a second elevation and along the front edge at a third elevation, the first elevation being greater than the second elevation and the second elevation being greater than the third elevation;

the top surface of the panel having a lower surface that slopes downward from the front edge to the back edge when the board is mounted on a cooler top or when mounted on a flat horizontal support surface;

a large flat horizontal first platform attached to and elevated above the sloping lower surface for cleaning thereon; and at least one additional flat horizontal platform attached to and elevated above the sloping lower surface and positioned closer to the back edge than the first platform for holding cleaned items.

* * * * *